United States Patent [19]

Patti

[11] Patent Number: 5,253,928
[45] Date of Patent: Oct. 19, 1993

[54] ATTACHMENT OF KINETIC WHEEL BALANCERS

[76] Inventor: Anthony J. Patti, 27610 Fairview Ave., Hayward, Calif. 94542

[21] Appl. No.: 2,798

[22] Filed: Jan. 11, 1993

[51] Int. Cl.$^5$ ............................................. F16F 15/22
[52] U.S. Cl. ................................. 301/5.22; 74/573 F; 301/37.1
[58] Field of Search .................... 301/5.21, 5.22, 37.1, 301/37.37; 74/573 F

[56] References Cited

U.S. PATENT DOCUMENTS

| | | | |
|---|---|---|---|
| 2,926,954 | 3/1960 | Lyon | 301/5.21 |
| 3,377,106 | 4/1968 | Whitlock | 301/5.22 |
| 3,953,074 | 4/1976 | Cox | 301/5.22 |
| 5,048,367 | 9/1991 | Knowles | 301/5.22 X |
| 5,142,936 | 9/1992 | McGale | 301/5.22 X |

FOREIGN PATENT DOCUMENTS 1088186 10/1967 United Kingdom ............... 301/5.22

*Primary Examiner*—Russell D. Stormer
*Attorney, Agent, or Firm*—Linval B. Castle

[57] ABSTRACT

A method of mounting a kinetic wheel balancer on a vehicle wheel involves a wheel cover having a interior annular recess near the periphery. The wheel balancer is merely placed in the recess and the wheel cover is installed. The balancer is locked firmly in place between the annular recess and a tire ring on the wheel.

7 Claims, 3 Drawing Sheets

ATTACHMENT OF KINETIC WHEEL BALANCERS

This invention relates to kinetic wheel balancers and particularly to their attachment to the wheels of trucks and heavy vehicles.

BRIEF SUMMARY OF THE INVENTION

Kinetic wheel balancers are tubes which are formed into a circle and which are concentrically mounted to a wheel of a vehicle. Spherical metal balls are in the tube and the tube is filled with oil and sealed.

A kinetic wheel balancer is used by attaching it to a wheel of a vehicle so that it is concentric with the wheel. As the wheel is rotated each of the metal ball weights within the tube will find its own position of equilibrium so that the wheel becomes properly balanced. This type of balancer is valuable for balancing wheels under many different road and wheel or tire conditions.

One problem with kinetic wheel balancers is in the installation. The most efficient balancing is with a tube of the greatest diameter possible, but to mount a large tube on a wheel is difficult. Small diameter tubes are easier to mount to a wheel because one can easily loosen three of four lug nuts on a wheel and insert a tab under them to attach the balancer. The result is a small kinetic balancer that does not operate efficiently.

The method to be described is particularly adaptable for a large diameter balancer. It does not attach the wheel balancer to the wheel, but to a wheel cover which is attached to the wheel by conventional methods.

BRIEF DESCRIPTION OF THE DRAWINGS

In the drawings which illustrate the preferred embodiment of the invention.

BRIEF DESCRIPTION

Figure 1:
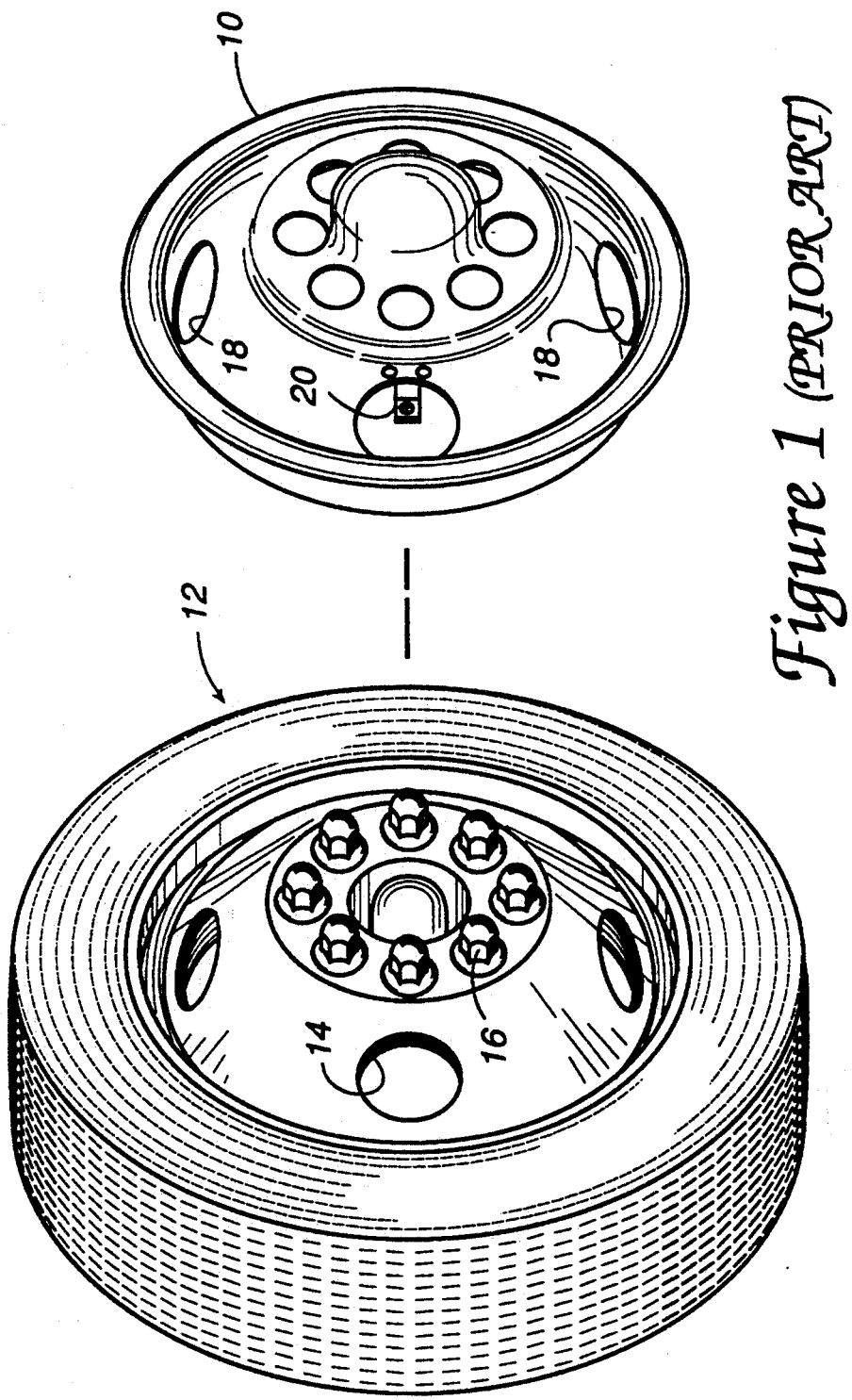
FIG. 1 is a perspective prior art drawing of a heavy duty wheel and an ornamental wheel cover.

FIG. 1 is a perspective drawing of a prior art truck front wheel assembly showing a wheel cover 10 and a wheel 12 of a vehicle. All truck wheels have hand holds 14 which may be used to grasp the wheel for tire changing and which are used for access to the tire air stem. The wheel cover 10 is an ornamental cover, usually of stainless steel or chrome plated steel, that covers the wheel 12 and hub and often the lug nuts 16. The wheel cover has openings 18 corresponding to the locations of the hand holds 14.

Figure 3:
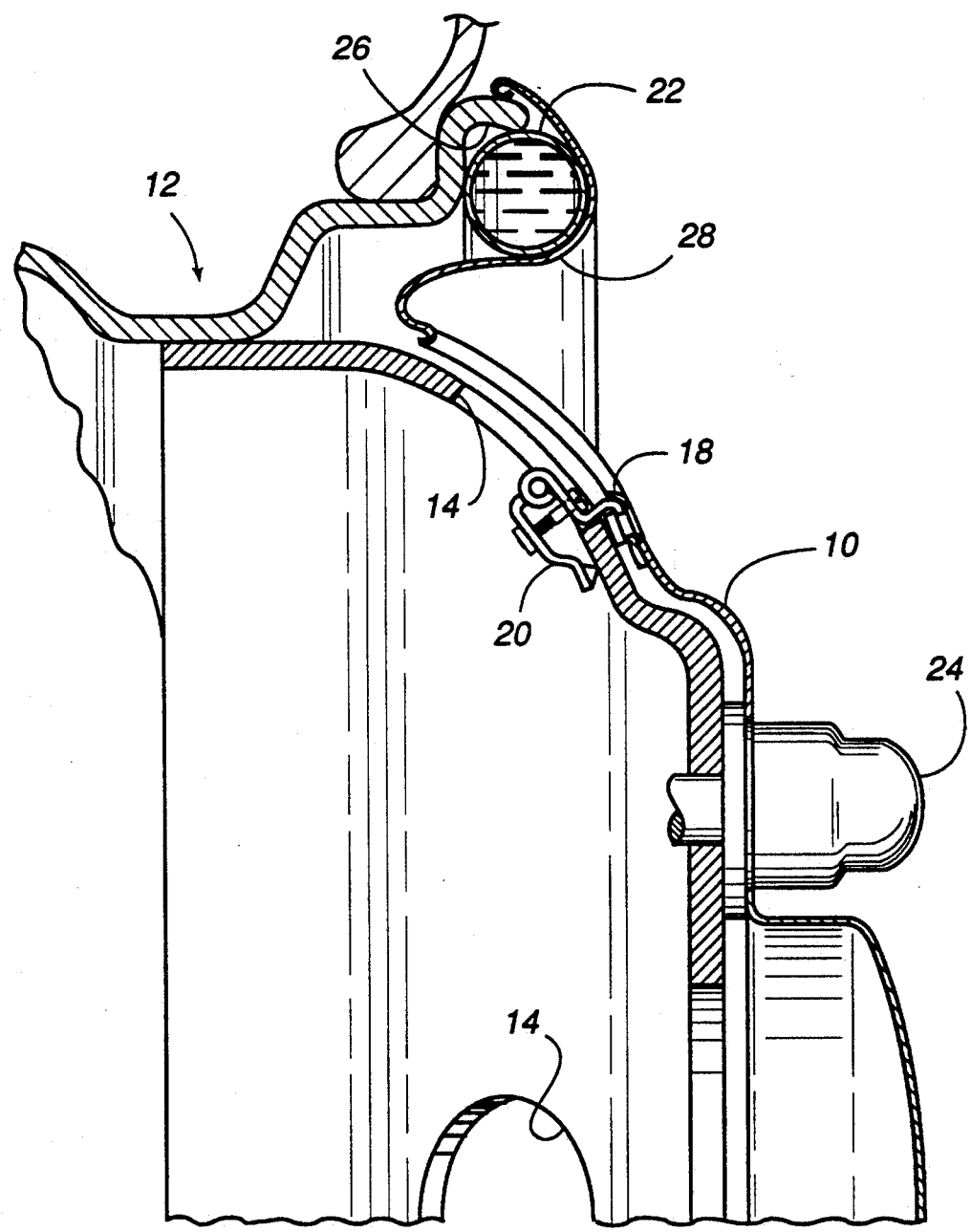
FIG. 3 is a view taken along the lines 3—3 of FIG. 2.

The wheel cover 10 may be attached to the wheel 12 by any one of several various methods, one of which is by clips 20 which are riveted to the wheel cover and which may be tightened to grasp the wheel around the edges of the hand holds 14, as shown in FIG. 3.

Figure 2:
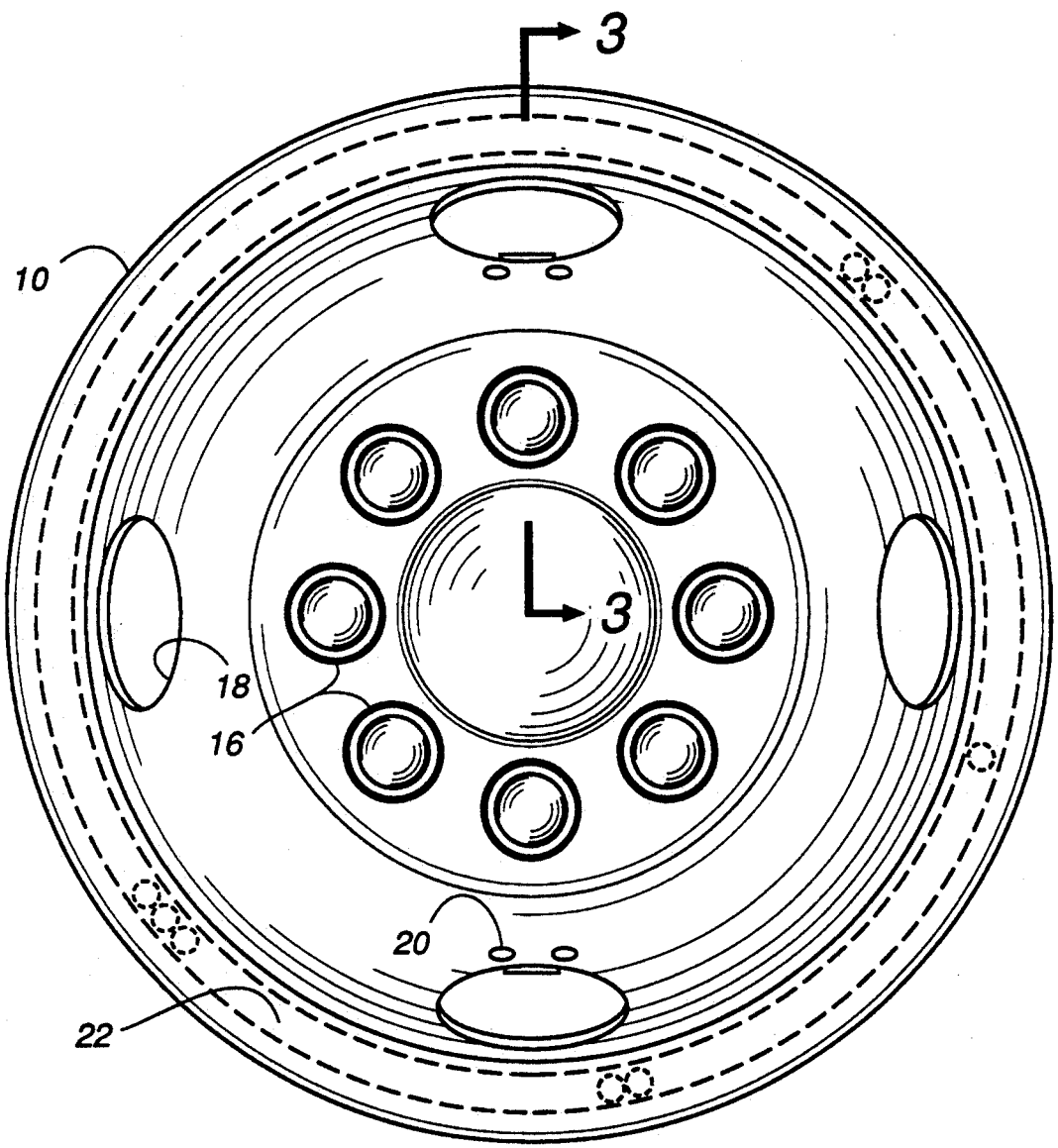
FIG. 2 is an elevational view of showing a kinetic wheel balancer in dashed lines.

FIG. 2 is an elevational view of the wheel cover 10 showing, by dashed lines, the kinetic wheel balancer 22 having a large diameter and located out near the rim of the wheel for concentric rotation with the wheel. As previously mentioned, the wheel balancer 22 comprises a circular tube that contains several metal balls. The tube is filled with oil and sealed. When attached to a rotating wheel of a vehicle, the balls will find a point of equilibrium and the wheel is balanced.

FIG. 3 is a sectional view taken along the lines 3—3 of FIG. 2 and illustrates a portion of the wheel 12 with its lug nuts covered by an ornamental cap 24, and the wheel cover 10 secured to the wheel 12. The kinetic wheel balancer 22 is concentrically mounted against the wheel 12, preferably against the outside of the tire rim 26 and within an annular recess 28 formed in the wheel cover 10. The recess 28 should conform to at least a portion of the diameter of the balancer and must be located so that, when the wheel cover is in place on the wheel, the balancer is captured between the wheel and the recess 28. Locked in this position, the wheel balancer is invisible and does not require any fastening. Such a recess 28 does not detract from the appearance of the wheel cover.

Installation of the balancer may be done by either placing it in the wheel cover recess and attaching the wheel cover to the wheel, or by placing the balancer against the wheel and holding it with a substance such as an adhesive tape while attaching the wheel cover.

I claim:

1. A method for attaching a kinetic wheel balancer to a vehicle wheel comprising:
   concentrically placing the wheel balancer on the interior of an ornamental wheel cover; and
   installing said wheel cover on a vehicle wheel whereby said wheel balancer is captured between said wheel cover and said vehicle wheel.

2. The method claimed in claim 1 wherein said wheel balancer is placed in an annular recess formed on the interior of the wheel cover.

3. The method claimed in claim 2 wherein said annular recess is formed, when installed, adjacent a tire rim on the vehicle wheel so that said wheel balancer is captured between said annular recess and said tire rim.

4. A method for attaching a kinetic wheel balancer to a vehicle wheel comprising the steps of:
   placing the wheel balancer in an annular recess in the interior of an ornamental wheel cover, said recess located adjacent the periphery of said wheel cover and, when installed, opposite an outer annular tire rim on said vehicle wheel; and
   mounting said wheel cover with said wheel balancer on said vehicle wheel, said wheel balancer being captured between said annular recess and said tire rim.

5. A method for attaching a kinetic wheel balancer to a vehicle wheel comprising the steps of:
   holding the wheel balancer concentrically against the wheel; and
   attaching a wheel cover to said wheel, said cover having an annular recess for capturing said wheel balancer between said cover and said wheel.

6. The method claimed in claim 5 wherein said step of holding said wheel balancer against the wheel includes the steps of:
   positioning the wheel balancer against the wheel: and
   causing said wheel balancer to cling to said wheel until the wheel balancer is installed.

7. The method claimed in claim 6 wherein said step of causing said wheel balancer to cling to said wheel is accomplished by holding said wheel balancer in position with an adhesive tape.

* * * * *